United States Patent [19]

Wiegard

[11] 4,042,015
[45] Aug. 16, 1977

[54] CENTRAL MOUNTING OF THE HEAT-EXCHANGE PLATE OF A REGENERATIVE HEAT-EXCHANGER

[75] Inventor: Klaus Wiegard, Esslingen-Zollberg, Germany

[73] Assignee: Daimler-Benz Aktiengesellschaft, Germany

[21] Appl. No.: 733,051

[22] Filed: Oct. 18, 1976

[30] Foreign Application Priority Data

Oct. 22, 1975   Germany .............................. 2547175

[51] Int. Cl.² ............................................. F28D 19/00
[52] U.S. Cl. ...................... 165/8; 267/160; 308/184 R; 308/184 A; 308/202; 308/207 R; 308/215
[58] Field of Search ............................. 165/8; 267/160; 152/254, 255, 256; 308/184 R, 184 A, 202, 207 R, 215

[56] References Cited

U.S. PATENT DOCUMENTS

| 1,030,688 | 6/1912 | Strawn | 152/256 |
| 1,287,762 | 12/1918 | Sagen | 152/256 |
| 3,061,386 | 10/1962 | Dix et al. | 308/184 R |
| 3,392,776 | 7/1968 | Topouzian | 165/8 |
| 3,774,675 | 11/1973 | Yoshiro | 165/8 |
| 3,976,340 | 8/1976 | Pitner | 308/184 R |

FOREIGN PATENT DOCUMENTS 2,249,763   4/1974   Germany .............................. 165/8

Primary Examiner—Albert W. Davis, Jr.
Attorney, Agent, or Firm—Craig & Antonelli

[57] ABSTRACT

A heat-exchanger disk of a regenerative heat-exchanger of a gas turbine, which is secured on a rotatable carrier under interposition of ring-shaped, series-connected leaf spring elements which are connected with each other at their overlapping ends and which are supported with outwardly curved arcuate portions at counter-surfaces in a central opening of the heat-exchanger disk and with inwardly curved arcuate portions at counter-surfaces of the carrier; one retaining disk substantially coaxial to the heat-exchanger disk thereby abuts at each end face of the heat-exchanger disk whereby the two retaining disks hold the leaf spring elements in the carrier within the central opening and are connected with each other by tie-pins which extend through the annular space between the central opening and the carrier.

7 Claims, 3 Drawing Figures

CENTRAL MOUNTING OF THE HEAT-EXCHANGE PLATE OF A REGENERATIVE HEAT-EXCHANGER

The present invention relates to a heat-exchanger disk of a regenerative heat-exchanger of a gas turbine, which is secured on a rotatable carrier under interposition of ring-shaped, series-connected leaf spring elements which are connected with one another at their overlapping ends and which are supported under prestress with outwardly curved arcuate portions thereof at counter-surfaces in the central opening of the heat-exchanger disk and with inwardly arcuate portions thereof at counter-surfaces of the carrier as described in German Patent Application P 23 61 697.9. As already indicated in the aforementioned German patent application, the leaf spring elements can be secured against axial displacement by special structural measures. This is advantageous because the differing gas pressures with prevail during the operation of the heat-exchanger in the individual channels, slightly tilt the heat-exchanger disk and displace the same axially with respect to its bearing support. As a result thereof, axial forces occur in the bearing support which may push the leaf spring elements out of the central opening of the heat-exchanger disk. The rotatable carrier of the heat-exchanger disk, for example, a race of a roller bearing is also exposed to the same dangers, however, no means for securing the rotatable carrier (race) are indicated or suggested in the aforementioned German application.

The present invention is therefore concerned with the task to eliminate these disadvantages and to provide a particularly suitable securing against an excessive displacement both of the leaf spring elements as also of the rotatable carrier. This is realized according to the present invention in that one retaining disk each coaxial to the heat-exchanger disk abuts at each end face of the heat-exchanger disk, which retain the leaf spring elements and the carrier in the central opening and which are connected with each other by way of tie-rods or tie-pins that extend through the annular space between the central opening and the carrier.

A reliable bearing support of a heat-exchanger disk constructed corresponding to the aforementioned German patent application is achieved by these measures in accordance with the present invention.

Accordingly, it is an object of the present invention to provide a central bearing support of a heat-exchanger disk of a regenerative heat-exchanger which avoids by simple means the aforementioned shortcomings and drawbacks encountered in the prior art.

Another object of the present invention resides in a bearing support of the heat-exchanger disk of a regenerative heat-exchanger which effectively provides a reliable bearing support of the heat-exchanger disk and its associated parts under all operating conditions by structurally simple means.

A further object of the present invention resides in a center bearing support of a heat-exchanger disk of a regenerative heat-exchanger in which both the leaf spring elements as also the rotatable carrier are secured against excessive displacements.

These and other objects, features and advantages of the present invention will become more apparent from the following description when taken in connection with the accompanying drawing, which shows, for purposes of illustration only, one embodiment in accordance with the present invention, and wherein.

Figure 1:
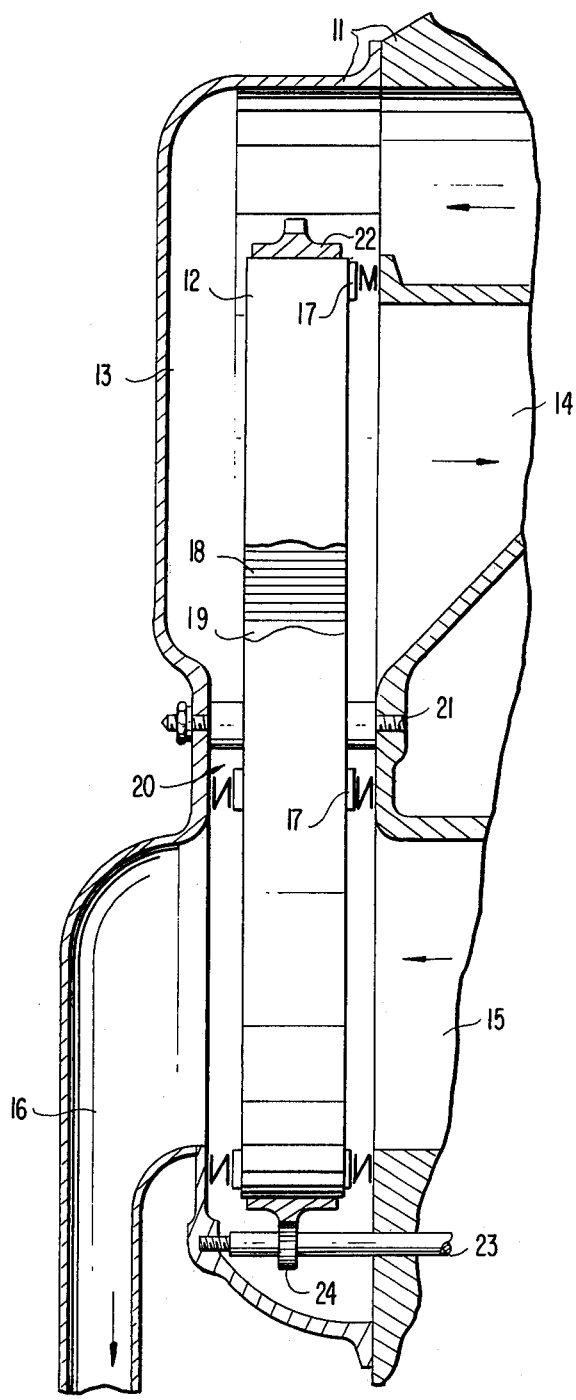
FIG. 1 is a somewhat schematic, longitudinal cross-sectional view through a regenerative heat-exchanger in accordance with the present invention.

Referring now to the drawing wherein like reference numerals are used throughout the various views to designate like parts, the regenerative heat-exchanger illustrated in FIG. 1 of a motor vehicle gas turbine essentially consists of a ceramic heat-exchanger disk 12 rotatably supported within a housing 11, of channels 13 and 14 for the combustion air as well as of channels 15 and 16 for the exhaust gases. Seals 17 prevent an escape of the gases out of the channels 14 to 16. The heat-exchanger disk 12 consists of axial passages 18 and of a solid core 19. It is supported on a shaft 21 secured in the housing 11 by means of a roller bearing generally designated by reference numeral 20 (FIG. 1). A toothed rim 22 is arranged at the circumference of the heat-exchanger disk 12, into which engages a pinion 24 secured on a shaft 23.

During the operation, the heat-exchanger disk 12 is set into rotation by way of the shaft 23 driven by the gas turbine (not shown), the pinion 24 and the toothed rim 22. The hot exhaust gases of the gas turbine are conducted through the channel 15 into the heat-exchanger disk 12, whereby the hot exhaust gases flow through the passages 18 and thereby give off heat to the heat-exchanger disk 12. The cooled-off exhaust gases leave the heat-exchanger disk 12 by way of the channel 16. The relatively cold combustion air supplied by the compressor (not shown) of the gas turbine flows through the channel 13 into part of the heat-exchanger disk 12 heated up by the exhaust gases and absorbs thereat heat. The heated combustion air is conducted by way of the channel 14 to the combustion chamber (not shown) of the gas turbine.

Figure 2:
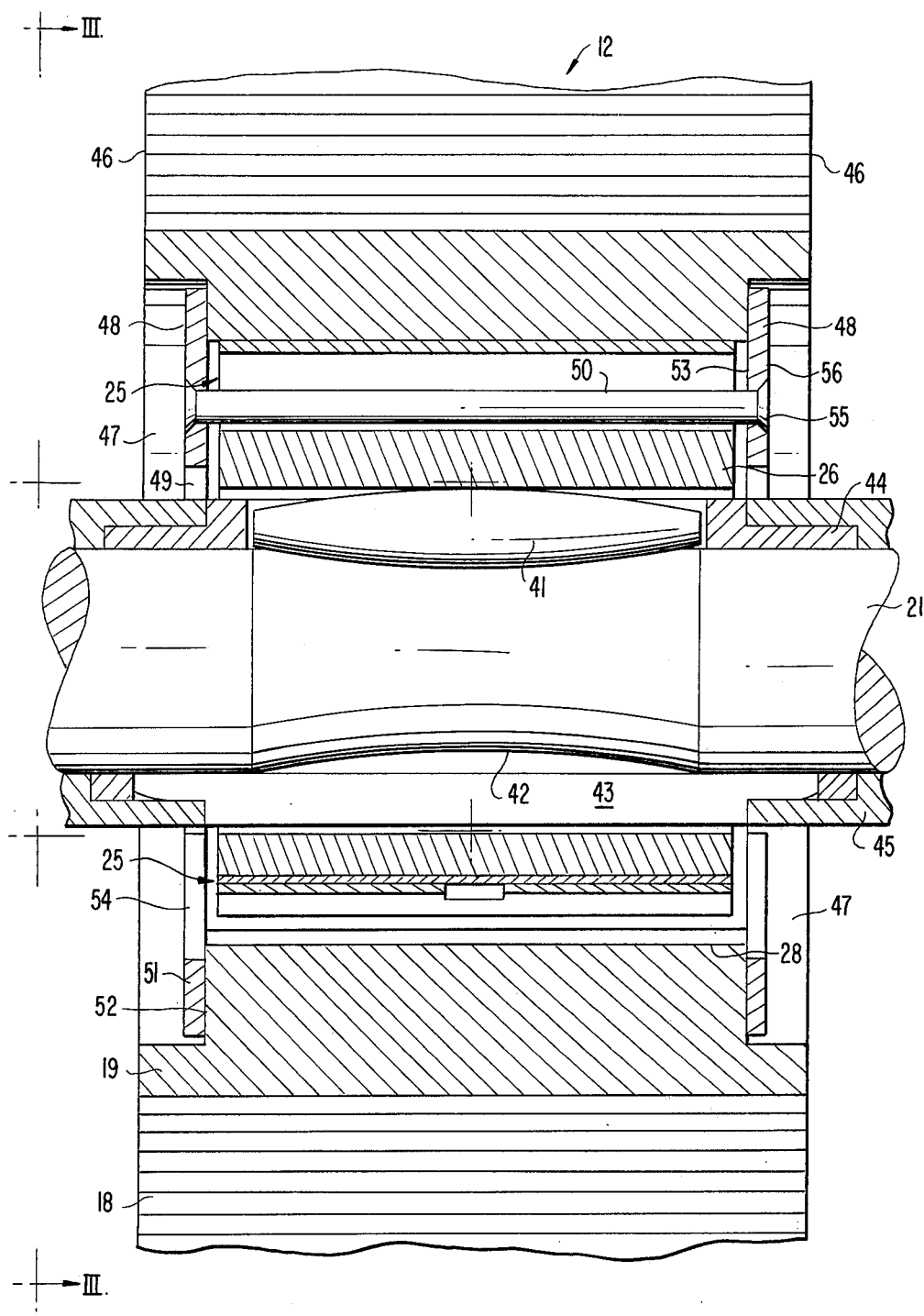
FIG. 2 is a longitudinal cross-sectional view, on an enlarged scale, through the bearing support of the heat-exchanger disk of the heat-exchanger of FIG. 1, taken along line II—II of FIG. 3.
Figure 3:
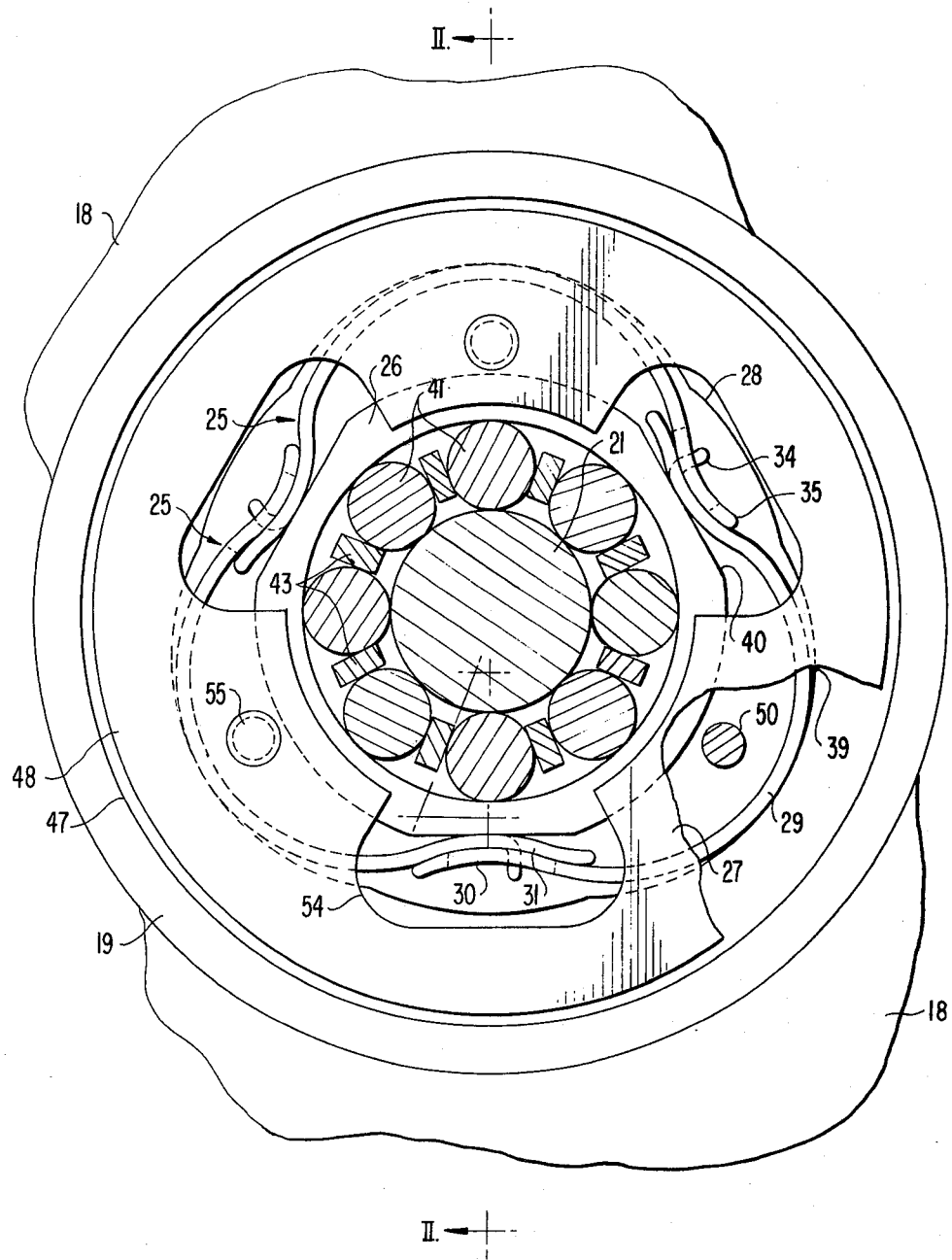
FIG. 3 is a transverse cross-sectional view through the bearing support taken along line III—III of FIG. 2.

As illustrated in FIGS. 2 and 3, the roller bearing 20 consists essentially of elongated, barrel-shaped roller bodies or roller members 41 which roll off, on the one hand, on section 42 of the shaft 21 concavely constructed corresponding to their shape, and on the other hand, on a bearing race 26. Bars 43 arranged between the roller members 41 form together with the bushes 44 and the retaining bushes 45, which partially surround the bars 43 and the bushes 44, the cage of the roller bearing 20.

In order to avoid harmful effects of the impacts and shocks occurring during the operation of the gas turbine on the heat-exchanger disk 12, the heat-exchanger disk, as can be seen in particular from FIG. 3, is secured on the race 26 of the roller bearing 20 by interposition of three leaf spring elements 25. The leaf spring elements 25 are thereby inserted under prestress into a free annular space 27 between the central opening 28 in the core 19 of the heat-exchanger disk 12 and the race 26 of the roller bearing 20 in such a manner that they form a ring. Adjacent leaf spring elements 25 thereby overlap one another whereby an extension 34 of one leaf spring element 25 engages with play in the circumferential direction into an opening 35 of the adjacent leaf spring element 25. Outwardly curved (convex) arcuate portions 29 of the leaf spring elements 25 are supported in recesses 39 in the opening 28 of the core 19 of the heat-exchanger 12 whereas overlapping inwardly curved (concave) arcuate portions 30 and 31 are supported on flattened-off portions 40 of the race 26 of the roller bearing 20 which are correspondingly distributed over the circumference.

Cyclindrical recesses 47 (FIG. 2) are provided at both end faces 46 of the heat-exchanger disk 12 within the area of the core 19. A ring-shaped retaining disk 48 is arranged in each recess 47, which surrounds the retaining bushes 45 under formation of an annular gap 49. The two retaining disks 48 are connected with each other by means of tie-rods or tie-pins 50 which extend through the annular space 27 between the opening 28 of the heat-exchanger disk 12 and the race 26 of the roller bearing 20.

The tie-pins 50 have a sufficient spacing from the leaf spring elements 25 so that they do not impair the movements thereof. The retaining disks 48 abut at each end face 46 within the area of their outer edge 50 against the bottom 52 of the recess 47 and thus extend so far radially inwardly that they limit axial movements of the leaf spring elements 25 and of the race 26 as occur during operation. Axial forces, which act by way of the leaf spring elements 25 or the race 26 on the inside 53 of one retaining disk 48, are transmitted by way of the tie-pins 50 to the other rotating disk 48 which is able to support itself at the end face 46 of the heat-exchanger disk 12 at which it abuts. Since the leaf spring elements 25 and the race 26 are retained in this manner inside of the opening 28 of the heat-exchanger disk 12, they are able to fulfill their tasks under all operating conditions of the heat-exchanger notwithstanding the axial forces which occur within the area of the roller bearing 20.

Each of the ring-shaped retaining disks 48 is provided with apertures 54 intermediate the tie-pins 50. The apertures 54 enable together with the annular gap 49 a through-flow of cooling air through the area of the roller bearing 20. Since the air-conducting channels 13 and 14 of the heat-exchanger which are delimited by the seals 17 include the shaft 21 and the roller bearing 20 of the heat-exchanger disk 12, a small portion of the compressed air is able to flow also through the area of the roller bearing 20 in parallel to the main flow through the passages 18 of the heat-exchanger disk 12, and is able to cool the same. The quantity of the cooling air can thereby be determined by the size of the annular gap 49 and the appertures 54.

The tie-pins 50 are so connected by welding with the retaining disks 48 that the welded places 55 are flush with the outsides 56 of the retaining disk 48. The recesses 47 at the end faces 46 are dimensioned so deep that the retaining disks 48 do not project above the heat-exchanger disk 12 so that no additional space is required in the housing 11 of the heat-exchanger.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A heat-exchanger disk of a regenerative heat-exchanger of a gas turbine, which is secured on a rotatable carrier means under interposition of ring-shaped leaf spring elements which are connected with each other near their ends and which are supported under prestress by way of outwardly curved arcuate portions at counter-surfaces in a central opening of the heat-exchanger disk and by way of inwardly curved arcuate portions at countersurfaces of the carrier means, characterized in that a retaining disk means abuts at each end face of the heat-exchanger disk, said retaining disk means holding the leaf spring elements and the carrier means, in the central opening and being connected with each other by tie pins which extend through the annular space between the central opening and the carrier means.

2. A heat-exchanger disk according to claim 1, characterized in that the retaining disk means are substantially coaxial to the heat-exchanger disk.

3. A heat-exchanger disk according to claim 2, characterized in that the leaf spring elements are connected with each other at their overlapping ends.

4. A heat-exchanger disk according to claim 3, characterized in that the retaining disk means are arranged in recesses at the end faces of the heat-exchanger disk.

5. A heat-exchanger disk according to claim 4, characterized in that the retaining disk means are provided with apertures for the passage therethrough of air to cool the bearing support of the heat-exchanger disk.

6. A heat-exchanger disk according to claim 1, characterized in that the retaining disk means are arranged in recesses at the end faces of the heat-exchanger disk.

7. A heat-exchanger disk according to claim 1, characterized in that the retaining disk means are provided with apertures for the passage therethrough of air to cool the bearing support of the heat-exchanger disk.

* * * * *